(12) United States Patent
Lázaro et al.

(10) Patent No.: US 9,869,294 B2
(45) Date of Patent: Jan. 16, 2018

(54) SAFETY STRUCTURE FOR PERFORMING SERVICING OPERATIONS IN A WIND TURBINE AND METHOD FOR ITS INSTALLATION

(71) Applicant: ALSTOM RENEWABLE TECHNOLOGIES, Grenoble (FR)

(72) Inventors: Ricardo Lázaro, Barcelona (ES); Miquel Tarragó Raventós, Molins de Rei (ES)

(73) Assignee: GE Renewable Technologies Wind B.V., Breda (NL)

(*) Notice: Subject to any disclaimer, the term of this patent is extended or adjusted under 35 U.S.C. 154(b) by 0 days.

(21) Appl. No.: 15/066,998

(22) Filed: Mar. 10, 2016

(65) Prior Publication Data
US 2016/0265507 A1    Sep. 15, 2016

(30) Foreign Application Priority Data

Mar. 13, 2015   (EP) ..................... 15382115

(51) Int. Cl.
*E04H 17/06* (2006.01)
*F03D 1/00* (2006.01)
(Continued)

(52) U.S. Cl.
CPC .............. *F03D 1/003* (2013.01); *E04G 21/32* (2013.01); *E04H 17/04* (2013.01); *E04H 17/06* (2013.01);
(Continued)

(58) Field of Classification Search
CPC ... E04H 17/1413; E06C 7/16; E04G 21/3223; E04G 21/3261; E04G 21/3219;
(Continued)

(56) References Cited

U.S. PATENT DOCUMENTS 5,269,623 A * 12/1993 Hanson ..................... E01F 7/00
256/13.1
5,649,392 A    7/1997 Svenning
(Continued)

FOREIGN PATENT DOCUMENTS

CA    2823271 A1    2/2014
EP    2466129 A2    6/2012
(Continued)

OTHER PUBLICATIONS

Extended European Search Report for European Application No. 15382115.2, dated Aug. 17, 2015, 8 pages.

*Primary Examiner* — Jonathan Masinick
(74) *Attorney, Agent, or Firm* — Dority & Manning, P.A.

(57) ABSTRACT

The safety structure comprises temporarily deployable safety bars that can be attached to a support member associated with at least one of a wind turbine hub, a wind turbine blade, a wind turbine root section, a wind turbine yaw mechanism, a wind turbine tower base, a wind turbine foundation, and a wind turbine nacelle. The bars can be coupled with each other and the structure may comprise at least one inflatable portion. The safety bars are first attached to the support member surrounding a wind turbine portion and then coupled to each other defining a fence structure.

13 Claims, 1 Drawing Sheet

(51) Int. Cl.
*F03D 80/50* (2016.01)
*E04G 21/32* (2006.01)
*E04H 17/22* (2006.01)
*E04H 17/04* (2006.01)

(52) U.S. Cl.
CPC ............. *E04H 17/22* (2013.01); *F03D 80/50* (2016.05); *Y02E 10/72* (2013.01)

(58) Field of Classification Search
CPC ............. E04G 21/3266; E04F 11/1812; E04F 11/1817; E04F 11/1861; F03D 1/003
See application file for complete search history.

(56) References Cited

U.S. PATENT DOCUMENTS

| | | | | |
|---|---|---|---|---|
| 5,683,074 | A * | 11/1997 | Purvis | E04G 21/3223 182/113 |
| 6,908,075 | B1 * | 6/2005 | Nichols | E04G 21/3219 182/113 |
| 7,806,232 | B2 * | 10/2010 | Thomas | E04G 21/3223 182/113 |
| 8,701,369 | B2 | 4/2014 | Kristensen | |
| 2003/0147753 | A1 | 8/2003 | Ollgaard | |
| 2004/0010993 | A1 | 1/2004 | Meadowcroft | |
| 2008/0157046 | A1 | 7/2008 | Murphy | |
| 2010/0135792 | A1 | 6/2010 | Niehues | |
| 2011/0024233 | A1 | 2/2011 | Lott | |
| 2012/0152651 | A1 * | 6/2012 | Jensen | F03D 1/003 182/113 |
| 2012/0210659 | A1 * | 8/2012 | Ollgaard | E04G 21/3261 52/173.1 |
| 2012/0241255 | A1 * | 9/2012 | Gomez Santamaria | E06C 7/16 182/113 |
| 2013/0089433 | A1 | 4/2013 | Mercado Diez et al. | |
| 2013/0302175 | A1 | 11/2013 | Munk-Hansen | |

FOREIGN PATENT DOCUMENTS

| | | |
|---|---|---|
| EP | 2484893 A2 | 8/2012 |
| EP | 2505834 A2 | 10/2012 |
| EP | 2532879 A1 | 12/2012 |
| WO | WO 2005/031159 A1 | 4/2005 |
| WO | WO 2011/103631 A1 | 9/2011 |
| WO | WO 2011/108933 A1 | 9/2011 |
| WO | WO 2012/065611 A1 | 5/2012 |
| WO | WO 2012/119932 A1 | 9/2012 |
| WO | WO 2014/108216 A1 | 7/2014 |

* cited by examiner

SAFETY STRUCTURE FOR PERFORMING SERVICING OPERATIONS IN A WIND TURBINE AND METHOD FOR ITS INSTALLATION

The application claims priority to European Application No. 15382115.2, Filed Mar. 13, 2015, the entire contents of which are hereby incorporated by reference.

Safety structures for performing servicing operations in wind turbines are disclosed herein. The present disclosure also refers to a method for installing said structures in wind turbines for performing servicing operations.

BACKGROUND

Some mandatory wind turbine servicing operations are required to be carried out at periodic intervals outside the wind turbine. Servicing operations comprise operations intended to ensure operational safety such as, for example, monitoring, inspection, repair and maintenance operations. Maintenance operations may comprise, for example, regularly retightening the bolts in the rotor for joining the pitch bearing to the hub in wind turbines. Inspection operations may comprise, for example, periodically inspecting pitch lubrication equipment outside wind turbines. All of such operations involve operators working in dangerous and critical areas at great heights outside the wind turbines.

A safety line is usually used to protect the operator(s) working outside wind turbines in addition to the use of other safety devices such as harnesses. This is regulated under guidelines in the wind sector such as the Environmental Health and safety (EHS) guidelines for hazard prevention in wind turbines.

Other solutions have been proposed consisting in providing anchoring ladders in the so-called naked nacelle designs for the passage of workers thereon. For example, EP2484893 discloses the use of a service platform attached to a wind turbine hub. The service platform comprises a flange extending outwards from the blade root perpendicular to the longitudinal blade axis, acting as a walkway including guardrails extending along the circumference of the platform.

The provision of ladders, platforms and the like however do not provide good accessibility to operators and involve cumbersome structures which are usually complex to install and remove.

Still further solutions have been provided in the art to improve operator safety. For example, it has been proposed to cover the wind turbines with a glass fibre housing. The disadvantage in this case is that the use of glass fibre material in large wind turbines is costly and negatively affects the aesthetic appearance of the wind turbine.

SUMMARY

A safety structure is disclosed herein for performing servicing operations in a wind turbine. Servicing operations may include monitoring, inspection, repair and maintenance operations and many other operations to be performed mainly outside a wind turbine. Thus, the present safety structure is intended to be installed outside a wind turbine.

The present safety structure comprises a number of temporarily deployable safety bars. The safety bars are adapted to be installed to the wind turbine such that they can be easily removed once the servicing operations have been completed.

The temporarily deployable safety bars can be attached to a support member that is associated with the wind turbine. In some cases, the support member may be provided in the wind turbine with the safety bars permanently attached thereto. In other cases, the safety bars are adapted to be removably attached to the support member. In this specific case, one end of the temporarily deployable safety bars, for example a lower end, may be adapted to be removably coupled to the support member. In some examples, the temporarily deployable safety bars might be telescopic to adapt the height of the safety structure according to the requirements. This may allow the safety structure to be properly stored.

A bar locking mechanism may be also provided. Such bar locking mechanism serves the purpose of locking the temporarily deployable safety bars to the support member. As described above, the locking mechanism may be removable such that the bars are removably coupled to the support member.

In some examples of the present safety structure, the bar locking mechanism may include magnetic parts, such as permanent magnets. Said magnetic parts are capable of generating a magnetic field suitable for attaching the temporarily deployable safety bars to the support member that is associated with the wind turbine.

It may be preferred that at least the safety bars comprise at least one inflatable portion. In some cases, it may be preferred that most of the elements of the safety structure comprise inflatable portions. The inflatable portions are suitable to protect operators against shocks during servicing operations in the wind turbine.

The present safety structure may include at least one bar coupling member for coupling the temporarily deployable safety bars to each other. The bar coupling member is capable of coupling the temporarily deployable safety bars to each other defining a fence structure. Such bar coupling member may comprise, for example, at least one coupling rope, at least one wire, at least one coupling mesh, or the like. It may be preferred that the bar coupling member is retractable. This facilitates and speeds up removal and storage of the safety structure parts.

The support member that is associated with the wind turbine may be adapted to define a base surface to facilitate the passage of at least one operator. This may be advantageous when the support member is not properly adapted for the passage of at least one operator when performing servicing operations in the wind turbine.

The support member may be permanently attached to at least one of a wind turbine hub, a wind turbine blade, a wind turbine root section, a wind turbine yaw mechanism, a wind turbine tower base, a wind turbine foundation, a wind turbine nacelle and similar wind turbine parts. The safety structure can be thus easily installed on a large number of wind turbine parts.

The temporarily deployable safety bars can be attached to the support member such that they are distributed on the support member covering an angle of at least 240° around the wind turbine part. This allows an access for the operator to be properly defined to reach the wind turbine part on which the servicing operations are to be performed.

The main advantage of the above described safety structure is it can be easily installed for performing monitoring, repair, servicing, inspecting, and maintenance operations and the like in a wind turbine while safely protecting the operator and according to current safety guidelines in wind sector. The safety structure can be installed quickly and can be removed easily once said operation has been completed.

A method for installing the above safety structure is also provided by means of which monitoring, repair, servicing, inspecting, and maintenance operations can be safely performed in a wind turbine. The method comprises attaching a number of temporarily deployable safety bars to the wind turbine to a support member that is associated therewith. The deployable safety bars could be already attached to each other or they could be provided as separate parts to be removably attached to the support member. If the safety bars are provided as separate parts, the safety bars should be coupled with each other. This may be carried out, for example, through one or a number of bar coupling members for defining a fence like structure. The already mounted safety structure is then ready to use for performing servicing operations on the wind turbine.

Once the servicing operations have been completed, the safety structure can be easily removed simply by detaching safety bars from the support member and decoupling the bar coupling members to disassemble the fence structure, if required. The safety bars can be conveniently stored in any suitable place.

With the above safety structure and method monitoring, repair, servicing, inspection and maintenance operations, and many other operations, can be performed in safe conditions, even in offshore applications where access is difficult, and where long time and costs are currently involved in rescue operations when accidents occur. The present safety structure and method allow risky situations for operators hanging at great heights such as 1.5 m or more from a harness to be avoided. The likelihood of accidents and injuries and thus costs are advantageously reduced. No extra structures or tools are required.

The safety structure that has been described above can be applied to many parts of a wind turbine. This structure is generally intended to be installed preferably on a horizontal plane, at least partially covering a perimeter, as stated above, to provide access to the operator to a wind turbine part to be inspected or where inspecting, monitoring, repair, servicing and maintenance operations, and other operations, are required to be performed in wind turbines.

Non limiting examples of locations where the present safety structure can be installed are wind turbine towers, near service openings, near instruments, sensors, beacons, antennas attached to tower, etc. However, the present safety structure can be also installed at the tower top level and near the yaw bearing such as near interfaces between sections, heights relevant to blade locations when blade is pointing downwards, and the like. Still further examples of locations where the safety structure can be installed are the tower base, the foundation, the nacelle, the blade, the root, in the vicinity of aerodynamic devices such as vortex generators, etc. Finally, the safety structure could be also installed even at the base level and at the entrance and/or the platform level.

Additional objects, advantages and features of embodiments of the safety structure and method will become apparent to those skilled in the art upon examination of the description, or may be learned by practice thereof.

BRIEF DESCRIPTION OF THE DRAWINGS

One particular example of the present safety structure will be described in the following with reference to the appended drawings, in which.

DETAILED DESCRIPTION OF THE EXAMPLE

Referring to the figures, a safety structure 100 for performing monitoring, inspection, repair, servicing and maintenance operations and the like in a wind turbine blade pitch bearing 130 is shown. The present safety structure 100 can be of course used for performing said operations and many more in other wind turbine parts.

Figure 1:
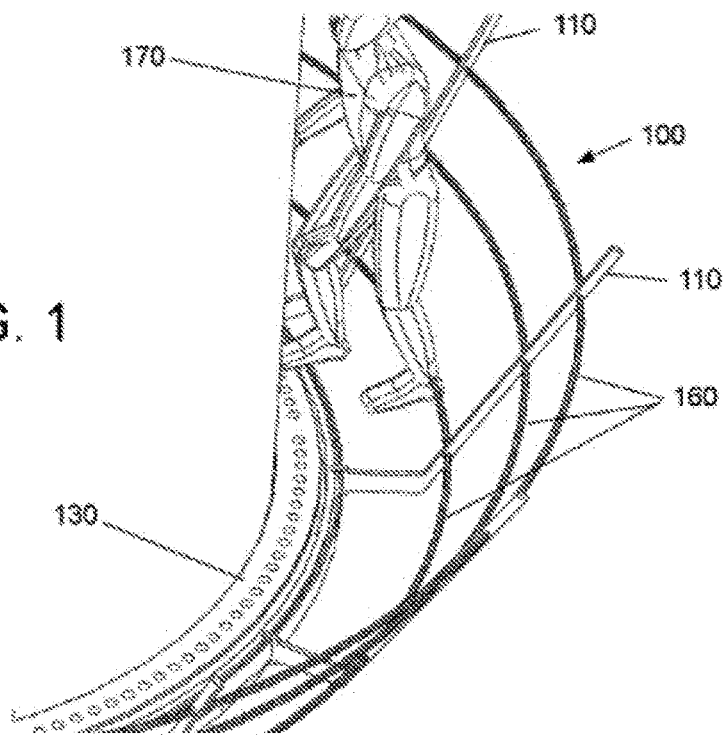
FIG. 1 is a fragmentary perspective view of one example of the safety structure for performing servicing operations outside a wind turbine.
Figure 2:
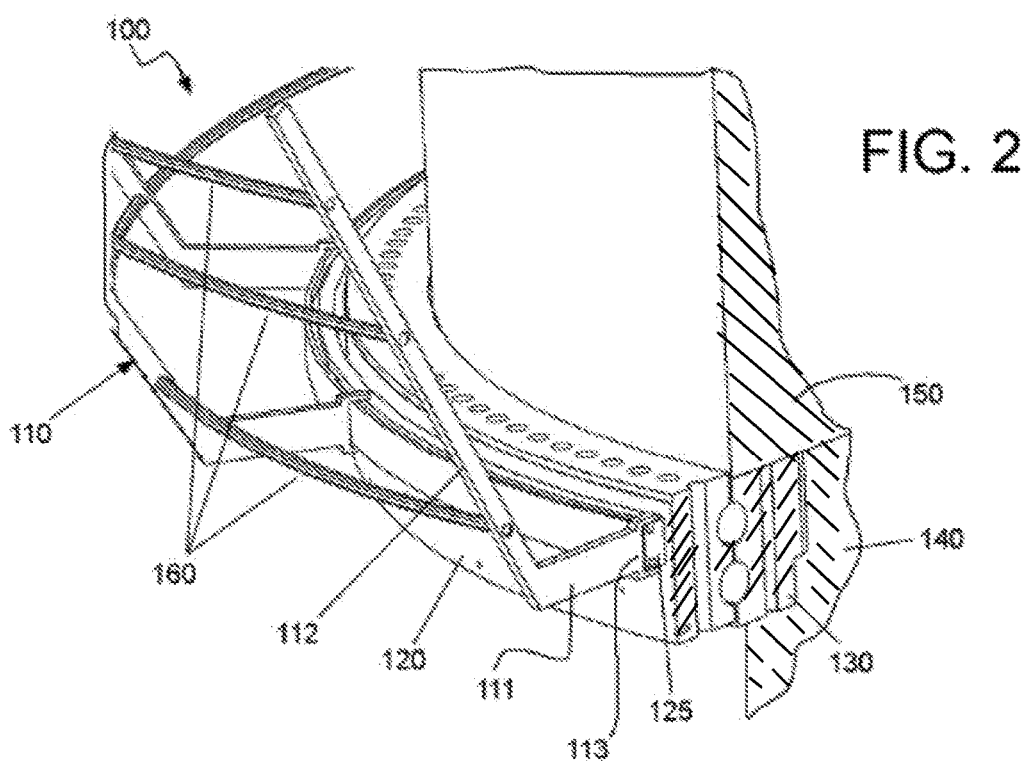
FIG. 2 is a fragmentary perspective view of the safety structure shown in FIG. 1 showing the support member and the safety bars in detail.

The safety structure 100 shown in FIGS. 1 and 2 comprises a number of temporarily deployable safety metallic bars 110. The safety bars 110 are shown in the figures attached to a support member 120 with the safety bars 110 arranged surrounding the wind turbine blade pitch bearing 130.

The support member 120 in the example shown is attached to the wind turbine pitch bearing 130. The pitch bearing 130 is thus attached both to the wind turbine hub 140 and to the blade root 150. Although the support member 120 is disclosed herein as being attached to the wind turbine pitch bearing 130, the support member 120 could be made integral with the turbine pitch bearing 130 or with any other suitable part of the wind turbine as required. In any case, the support member 120, whether it is a separate part or it is embedded in a wind turbine part, can be attached only to the pitch bearing 130 or directly to the hub 140 as required.

The temporarily deployable safety bars 110 in the example shown have a substantially horizontal bottom portion 111. The bottom portion 111 of the safety bars 110 extends into a substantially outwardly inclined portion 112. The bottom portion 111, together with the support member 120, form a base surface to facilitate the passage of the operator or operators 170, as shown in FIG. 1 of the drawings. The bottom portion 111, the outwardly inclined portion 112, or both portions 111, 112 of the safety bars 110 may be telescopic.

A lower end 113 of the bottom portion 111 is adapted to be removably coupled to the support member 120. Specifically, the lower end 113 of the bottom portion 111 has a substantially U shaped profile to slidingly receive a complimentarily shaped guide portion 125 in the support member 120. The safety bars 110 are thus allowed to run along the guide portion 125 of the support member 120. The safety bars 110 can be thus suitably removably locked to the support member 120 through any appropriate bar locking mechanism such as a magnetic device.

Bar coupling members 160 are also provided for coupling the safety bars 110 to each other. In the example shown in FIG. 1 and FIG. 2, the bar coupling members 160 comprise a number of substantially parallel ropes or wires extending between the safety bars 110. When the safety bars 110 have been deployed, as shown in the figures, a fence structure is defined. The ropes 160 may be retractable for facilitating removal and storage of the safety structure 100.

Although not shown in the drawings, the fence structure defined by the safety bars 110 and the ropes 160 might not completely cover the blade root 150 but an angle of at least 240° for example around the blade root 150. This has the purpose of allowing access for the operator 170 to a wind turbine part when required.

For installing the safety structure 100, a number of temporarily deployable safety bars 110 are attached separately to the support member 120 surrounding the wind turbine blade pitch bearing 130. Then, the safety bars 110 are coupled to each other through the ropes 160 forming a fence structure.

With the safety bars 110 coupled to each other through the ropes 160, the safety structure 100 is ready to be used for performing servicing operations on the wind turbine. Once the servicing operations have been completed, the safety structure 100 can be disassembled by removing the ropes 160 and detaching the bars 110 from the support member 120. The safety bars 110 together with the ropes 160 can be stored in any suitable place inside the wind turbine or in a suitable place external thereto.

Although the safety structure 100 is shown in the example drawings attached to the pitch bearing 130 or the hub 140, the safety structure 100 might be fixed to a ring extender, for example.

Although not shown, an extra floor could be provided fixed to the hub 140 if required. The safety bars 110 could be thus removably attached to said floor through reinforced holes formed therein.

Although only a number of particular examples of the safety structure and method have been disclosed herein, it will be understood by those skilled in the art that other alternative examples and/or uses and obvious modifications and equivalents thereof are possible. Furthermore, the present disclosure covers all possible combinations of the particular examples described. Thus, the scope of the present disclosure should not be limited by particular examples, but should be determined only by a fair reading of the claims that follow.

The invention claimed is:

1. A wind turbine assembly, comprising:
   a wind turbine comprising:
      a tower;
      a nacelle mounted atop the tower;
      a rotor mounted to the nacelle, the rotor comprising a rotatable hub comprising at least one rotor blade mounted thereto via a pitch bearing; and
   a safety structure for performing servicing operations in the wind turbine, the safety structure comprising a number of temporarily deployable safety bars attached to a plurality of circumferential locations on a curved support member arranged around the pitch bearing of the wind turbine such that the temporarily deployable safety bars are distributed on the support member to at least partially horizontally encircle the pitch bearing, each of the temporarily deployable safety bars comprising a substantially horizontal bottom portion extending into a substantially outwardly inclined angled portion.

2. The wind turbine assembly according to claim 1, wherein the temporarily deployable safety bars have a lower end adapted to be removably coupled to the support member.

3. The wind turbine assembly according to claim 1, wherein the safety structure further includes a bar locking mechanism for locking the temporarily deployable safety bars to the support member.

4. The wind turbine assembly according to claim 3, wherein the bar locking mechanism includes magnetic parts capable of generating a magnetic field for attaching the temporarily deployable safety bars to the support member.

5. The wind turbine assembly according to claim 1, wherein the safety structure further includes at least one bar coupling member for coupling the temporarily deployable safety bars to each other, thereby defining a fence structure.

6. The wind turbine assembly according to claim 5, wherein the bar coupling member comprises a coupling rope or wire.

7. The wind turbine assembly according to claim 1, wherein the bottom portion together with the support member form a base surface to facilitate the passage of at least one operator.

8. The wind turbine assembly according to claim 1, wherein the support member is permanently attached to at least one of a wind turbine hub, a wind turbine blade, a wind turbine root section, a wind turbine yaw mechanism, a wind turbine tower base, a wind turbine foundation, and a wind turbine nacelle.

9. The wind turbine assembly according to claim 1, wherein the temporarily deployable safety bars can be attached to the support member such that they are distributed on the support member covering an angle of at least 240° around the wind turbine part.

10. The wind turbine assembly according to claim 1, wherein the horizontal bottom portion defines a first end of the temporarily deployable safety bars, the first end secured to the curved support member, and wherein the outwardly inclined angled portion defines a free second end of the temporarily deployable safety bars.

11. A method for installing a safety structure for performing servicing operations on a wind turbine part, the method comprising:
   securing a curved support member to at least one of a pitch bearing, a yaw bearing, a rotor blade, a hub, or a tower of the wind turbine; and
   attaching a number of temporarily deployable safety bars to at a plurality of circumferential locations on the curved support member such that the temporarily deployable safety bars are distributed on the support member to at least partially horizontally encircle a wind turbine part, each of the temporarily deployable safety bars comprising a substantially horizontal bottom portion extending into a substantially outwardly inclined angled portion.

12. The method according to claim 11, wherein the method further comprises coupling the temporarily deployable safety bars to each other through at least one bar coupling member defining a fence structure.

13. The method according to claim 11, wherein the horizontal bottom portion defines a first end of the temporarily deployable safety bars, the first end secured to the curved support member, and wherein the outwardly inclined angled portion defines a free second end of the temporarily deployable safety bars.

* * * * *